3,514,349
METHOD OF MANUFACTURING OIL FILLED ELECTRIC CABLES AND APPARATUS FOR MANUFACTURING THE SAME

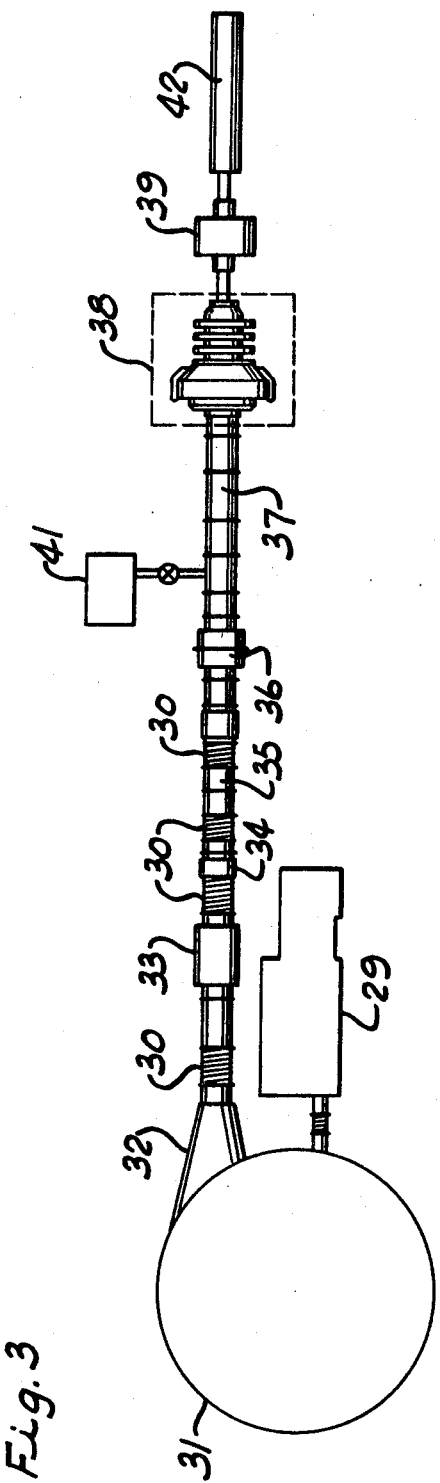
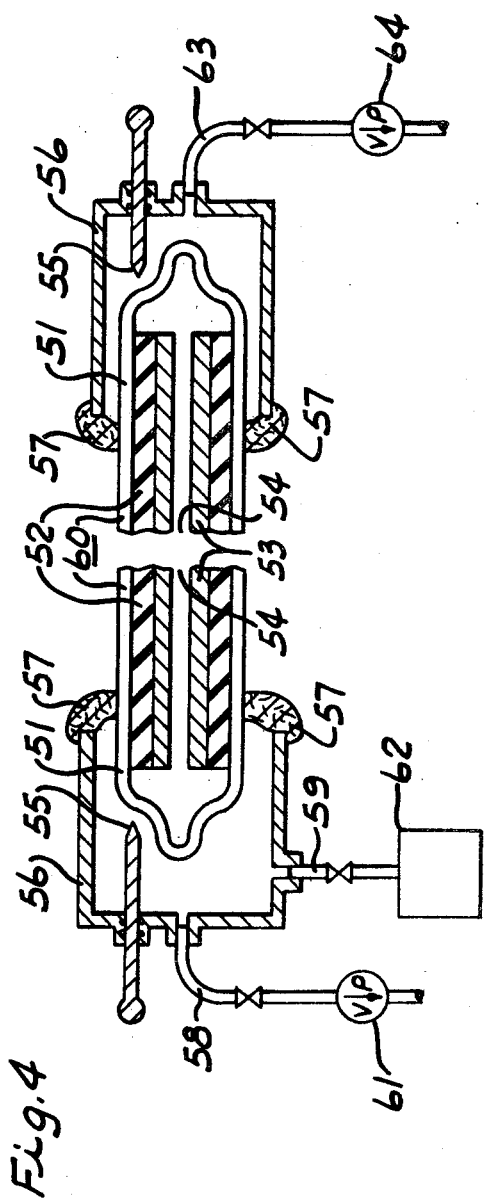
Fig. 3
Fig. 4
INVENTORS
MASAMOTO SHIROYO,
HIROSHI KUBO & HIDEO KAKUZEN
BY
William D. Carothers
THEIR ATTORNEY

Masamoto Shiroya, Tokyo, Hiroshi Kubo, Osaka-fu, and Hideo Kakuzen, Osaka, Japan, assignors to Sumitomo Electric Industries, Ltd., Osaka, Japan, a company of Japan
Continuation of application Ser. No. 145,688, Oct. 17, 1961. This application June 18, 1968, Ser. No. 749,241
Claims priority, application Japan, Oct. 19, 1960, 35/42,777; Mar. 29, 1961, 36/11,078
Int. Cl. H01b 13/24, 17/34
U.S. Cl. 156—48          9 Claims

ABSTRACT OF THE DISCLOSURE

The method of and apparatus used in the manufacturing of oil-filled cables under continuous vacuum conditions. The cable core is dried under vacuum in a drying vessel or chamber and then is passed through a vacuum tight joint seal into a sheathing chamber where the cable is sheathed and the sheathed core ends are sealed all under vacuum conditions. The ends of the sheathed cable are fitted hermetically on an evacuating device and the sheathing at the cable ends is punctured to permit the passage of insulating oil into the cable core at one end of the sheathed cable while a vacuum is being maintained by the evacuating device at the other end of the sheathed cable until the cable core is completely impregnated with the insulating oil.

---

This is a continuation of patent application Ser. No. 145,688, filed Oct. 17, 1961.

This invention relates to a method of manufacturing oil filled electric cables and apparatus for manufacturing the same.

Oil filled cables have hitherto been manufactured in the following conventional manner: The cable core is dried in a vacuum tank, or is previously heated and dried in a drying furnace and then dried in a vacuum tank, in order to remove water contained in the insulation of the core. Then the cable core is covered with a lead or aluminum sheath. Then dehumidifying and degassing are carried out again in a drying furnace, with the interior of the sheath kept vacuum, in order to remove water and gas that have been absorbed during sheathing operation.

When the aforementioned cable core is sheathed, a heating cover which covers the cable core is used, or the cable core is subjected to the sheathing operation in an atmosphere of a dry gas, for the purpose of minimizing the absorption of moisture during the sheathing operation by the cable core that has previously been dehumidified and degassed.

However, the above operations are not quite satisfactory for the purpose of preventing the absorption of moisture during the sheathing process.

In the above hitherto practiced method, the hollow oil passage in the longitudinal direction of the cable is always utilized for the dehumidifying and degassing operations after the sheathing operation is made, so that these operations prove to be of a poor efficiency. The higher the degree of the dehumidifying and degassing required, the lower the efficiency. Again the longer the unit length of the oil filled electric cable, the lower the efficiency in dehumidifying. This method has turned out to be a bottleneck in manufacturing oil filled electric cables of a high quality in a large quantity.

As to a countermeasure to overcome this difficulty, it is sometimes the practice to impregnate the cable core with an insulating oil, and to subject such cable core, immersed in oil, to the sheathing operation, just as in the case of solid cables. The defect of this method is that the prevention of absorption of gas by the insulating oil is not satisfactory. Furthermore, the cables are apt to be soiled and deteriorated. For these reasons it is the general practice to immerse the oil filled cables in an oil of the type used to fill the cables after sheathing.

The speed of absorbing moisture in dry paper and the speed of absorbing gas in insulating oil for oil filled cables is extremly high. It has been desired to find a manufacturing method which is of a high efficiency and is free from these defects.

The first object of this invention is to provide a novel method of manufacturing in which the drawbacks and problems of the present method of manufacturing oil filled electric cable are eliminated and which satisfies the aforementioned desires. The method of manufacture comprising this invention is characterized in that the covering of the cable core with a sheath is carried out while the cable core, that has been dehumidified and degassed, is kept in the state of vacuum.

The second object of this invention is the provision of the structure for carrying out the aforementioned method of manufacture. This apparatus consists of a vacuum cell containing the dehumidified and degassed cable core connected to a cable sheathing machine which covers the cable core without its having lost its vacuum.

A further object of this invention is to provide a method for impregnating the interior of the cable with an insulating oil, sheathed while the core is maintained vacuum sealed by a cable sheathing machine connected with vacuum cell containing the dehumidified and degassed core by the steps of fitting an impregnating cap to both ends of the cable, introducing the insulating oil into the interior of the cable through one of the oil impregnating caps while vacuum is drawn through the oil impregnating cap at the other end.

Other objects and advantages appear hereinafter in the following description and claims.

The accompanying drawings show for the purpose of exemplification without limiting this invention or the claims thereto, certain practical embodiments illustrating the principles of this invention wherein:

FIG. 3 is a plan view of the apparatus comprising this invention.

FIG. 4 is a view in cross section illustrating the manner of sealing a sheath cable while maintaining the core under vacuum and impregnating the same with insulating oil.

Figure 1:
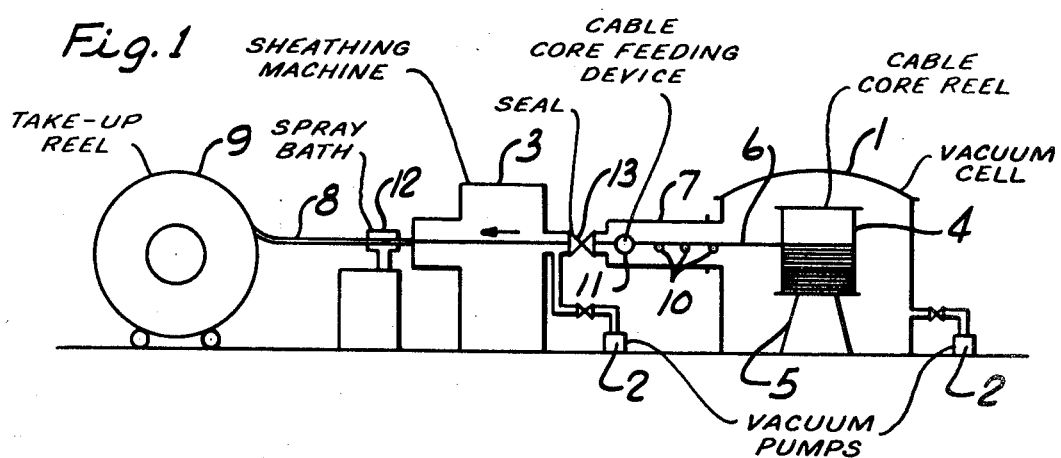
FIG. 1 is a diagrammatic view of the structure for manufacturing oil filled electric cable in accordance with this invention.

Referring to FIG. 1 of the drawings, 1 is a vacuum cell or tank which is kept in the state of vacuum by a large capacity vacuum pump 2. On one side of the vacuum cell 1 is mounted a cable sheathing machine 3 such as a continuous lead sheathing machine which is mounted in a second vacuum cell or tank. The reel 4 of oil filled cable core 6 is rotatably supported upon the stand 5 in the vacuum cell 1. The vacuum cell 1 and the cable sheathing machine 3 are connected together by means of a tubular extension 7, the interior is isolated from the atmosphere and is kept in the same state of vacuum as the interior of the vacuum cell 1. The cable 6 is filled with oil and sheathed in a vacuum, not merely emersed and sheathed while immersed.

The oil filled cable core 6 is drawn from the reel 4 in the vacuum cell 1 and carried over the guide rolls 10 and the feed rolls 11 in the tubular extension of the cell. The core is then passed through the seal 13 into the sheathing machine 3 which is also exhausted by the vacuum pump 2. In this machine a lead sheath is continuously formed over the oil filled core 6 and the lead covered cable 8 passes through another seal to the exterior of the sheathing machine 3 where it is bathed in a cooling spray at 12 before it is wound on the reel 9 as a finished product.

In the method of manufacturing oil filled cables of this invention, the cable core is dehumidified and degassed by subjecting it to a vacuum heating in a vacuum tank, with or without previous heating and drying in a drying furnace. Then, this dehumidified and degassed cable core 6 is filled with oil and is taken out of the vacuum tank and is loaded upon the supporting stand 5 in the vacuum cell 1 in the rear of the cable sheathing machine 3. After the lid is closed, this vacuum cell is exhausted by the vacuum pump 2 to dehumidify and degas the cable core and the chamber for several hours. Heating may be done at this time, but the sensible heat left over from the interior of the first vacuum tank or cell 1 is good enough for this purpose.

The aforementioned dehumidifying and degassing steps are sufficient if it removes the moisture and the gas absorbed by the core 6 during several minutes spent in the transfer of the cable core 6 from the previous vacuum treatment tank to the vacuum cell 1.

In the meantime, preparations are made for the operation of the lead sheathing machine 3. One end of the cable core 6 is placed in the feeding device 11 which draws the cable core 6 off the reel 4 and passes it through the cable seal 13 to the exhausted sheathing machine 3. The cable core 6 has been continuously kept under vacuum. This cable core may be covered with a cable sheath of lead, aluminum, plastic or the like, while in the state of vacuum and without being exposed to the atmosphere.

The cable that has been sheathed is immediately capped and the core as well as the space between the core and the sheath may be filled with an insulating oil.

Consequently, the cable core does not have an opportunity to absorb moisture at all. Furthermore, it is not necessary to carry out dehumidifying and degassing operations after sheathing. The dehumidifying and degassing in the vacuum cell 1 are effective in both the radial and the longitudinal directions of the cable core occurring immediately and at an enhanced rate of time, so that it takes only several hours.

According to the results of actual measurement, it took ten or more days for the conventional method of dehumidifying and degassing after the sheathing operation in the manufacture of oil filled cable. When the manufacturing method of this invention is used, the dehumidifying and degassing operations after sheathing can be dispensed with and the dehumidifying and degassing in the vacuum cell before sheathing take only a few hours and in materially less time than a half day.

Figure 2:
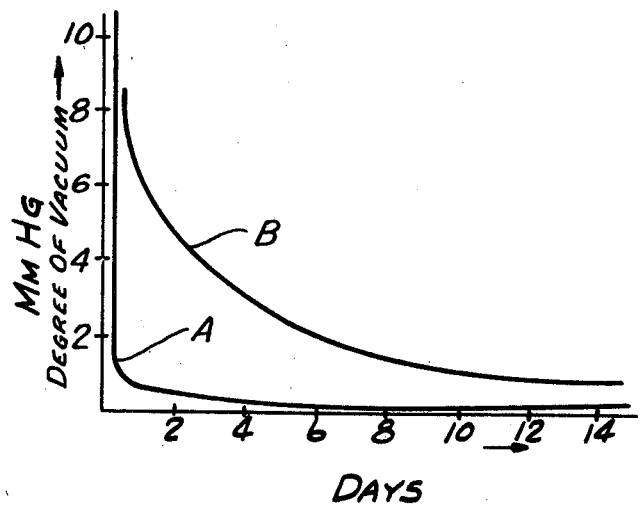
FIG. 2 is a view illustrating a diagram to show the comparative effect on a cable when filled with insulating oil as taught by this invention and a method of the conventional type.

A relationship between the dehumidifying and degassing effect expressed in the degree of vacuum (mm. Hg) and the number of days spent for the drying after the dehumidifying and degassing in the vacuum tank in the manufacture of oil filled cable is shown in FIG. 2 for the method of this invention (A) and for the method of the conventional type (B) initially referred to herein.

FIG. 3 illustrates an embodiment of the apparatus for the manufacture of oil filled cables by the method of this invention. In this figure, the vacuum cell 31 has the cable core outlet 32. The reel of the cable core housed within cell 31 is rotatably supported on a pivot in the center of the vacuum cell 31 and the outlet 32 is tangentially disposed to this reel. The tubular extension 32 of the vacuum cell 31 contains a feeding device having a pair of caterpillars and feed rollers installed in this sealed chamber section 33 to press against and feed the cable core continuously. The chamber section 33 is hermetically connected to the discharge section 32 of the vacuum chamber 31 and the other chamber sections by the sealed bellows pipe 30. The valve 36 which passes the core is connected by the conduit 37 to the vacuumized sheathing machine 38. The sheathed cable is passed to the sealth squeezing device 39 or a suitable hand-operated crushing device, or the like, provided near the outlet of the aforementioned sheathing machine 38. Between the paying out or feeding device 33 and the cable sheathing machine 38 is interposed for the convenience of practical operation a valve 36 such as a butterfly valve, sluice valve, or other air stop valve, which when open, does not interfere with the passage of the cable core. It is thus made possible to divide the vacuum part into two stages, front and rear, by closing the valve 36. Support or guide rollers are provided in chamber section 34 and the bellows pipes 30 are interposed for connection therebetween to permit elongation and contraction of this tubular passage. A transparent pipe 35 is interposed in the piping in order to make it possible to inspect the interior of the pipe. The vacuum chamber 31 and the tube 37 is provided with the vacuum pumping devices 29 and 41 for the front and rear stages, respectively.

When starting the operation of this apparatus, first the empty or oil filled cable core is inserted in the vacuum chamber 31 and its capped end is inserted in the paying out device in 33 after putting it through the bellows 30. The air stop valve 36 is closed and the front stage or section ahead of the valve 36 is exhausted by operating the vacuum pump 29. In this case, the degree of vacuum is 1/1000 mm. Hg at maximum. The cable sheathing machine 38 is adjusted for the cable core to be presented and when it is found in proper working condition, the vacuum pump 41 is operated and the sheath squeezing machine 39 is operated at the same time to squeeze and seal the sheath ahead of the core to seal the same as well as on the cable core itself. A vacuum of the same degree is maintained in the rear stage, namely the interior of the pipe 37 and the cable sheathing machine 38. As soon as the air or communicating valve 36 is opened, the cable core paying out device 33 is operated. The whole of the apparatus from the cell 31 to the sealed outlet of the cable sheathing machine 38 is maintained under vacuum and thus the oil filled cable core is sent into the cable sheathing machine 38 under vacuum.

The cable after having been sheathed passes through the squeezing device 39 which is open to the atmosphere and the sheathed cable is taken up on a reeling drum after passing through a cooling device 42 or the like. When the whole length of the cable core has passed through the sheathing process and passed the squeezing device 39, the paying out device 33 and the cable sheathing machine 38 are stopped temporarily and the squeezing device 39 is operated to squeeze and seal the sheath behind the core and the surplus part of the sheath is cut off. Thus it is possible to sheath the whole length of the cable while maintained under vacuum.

The apparatus of this invention is constructed and operated as stated above, so that the degree of vacuum in the cable after sheathing is extremely high. According to the results of operations, it is kept at approximately 2/100 mm. Hg. It is therefore possible to obtain an excellent cable of an extremely high degree of dryness in an easy and sure way obtaining a high cable efficiency.

When the method and apparatus of the conventional type are employed, the cable core that has once been dried and is left in the air during the lead sheathing operation absorbs moisture. It is inevitable that a considerable quantity of moisture is absorbed during this period of time which may last several hours. If this invention is used, however, the sheathing operation is carried out in a chamber under vacuum for the whole process. Even if the cable core contains some moisture, drying is effected by the sheathing operation under vacuum and there is no possibility that moisture is absorbed again during the operation and before the cable is sealed. It is advantageous, therefore, to eliminate the time and trouble to afterdry the cable.

The division of this apparatus into two stages, front and rear, and the provision of a vacuum pumping device of a suitable capacity for each of the stages makes the operation easy to set up and commence and convenient to maintain a high degree of vacuum.

FIG. 4 is a cross-sectional view illustrating the method of impregnating with insulating oil the cable that has been sheathed by the aforementioned manufacturing method with the aforementioned manufacturing apparatus.

Enclosure means in the form of the oil impregnating caps 56 are fixed to both ends of the sheathed cable 60 in the manufacturing process. The joint between the oil impregnating cap 56 and the cable 60 is sealed air-tight by wrapping the lead sheath or by means of a packing 57. 53 is the conductor of the cable, 52 the insulating paper, 51 the cable sheath, and 54 the oil passage.

55 is an awl operable in each oil impregnating cap 56 and sealed with respect thereto, 58 the pipe leading to the vacuum pump 61 and 59 is the pipe leading to the gravity feed oil tank 62.

First, the pipes 58 and 63 leading from the oil impregnating caps 56 at each end of the cable 60 to the vacuum pumps 61 and 64, respectively, are opened to exhaust the interior of the oil impregnating caps 56 and produce a vacuum therein. Then a hole is made in the sheath 51 with the sealed awls 55. Thereafter, the valve between the oil impregnating cap 56 shown at left on the drawing and the vacuum pump 61 for it is closed, and the valve in pipe 59 leading to the oil feed tank 62 on that side is opened in order to introduce degassed insulating oil into the interior of the cable for impregnation through the hole made in the cable sheath 51. Thus, the cable may be filled from one end only.

At the other end of the cable 60, the interior of the oil impregnating cap 56 connected to the vacuum pump 64 is maintained to continually exhaust the cap and continuously draw a vacuum on the interior of the cable through the hole made by the awl 55. When the oil appears in the pipe 63 leading to the vacuum pump 64 on that side, the impregnation of the cable 60 with insulating oil is completed, thus filling the cable from one end by a vacuum drawn on the other.

If the impregnation of the cable core with insulating oil is made before the cable is sheathed, it will be unnecessary to follow the foregoing operation. After sheathing the oil filled cable core the outer covering may be applied immediately.

In employing the method of this invention, the results will be similar if the vacuum produced by exhausting the oil impregnating cap 56 through the pipe 58 at the left in FIG. 4 is degassed and a hole is made in the sheath by the awl 55 to exhaust the cable, then the pipe 58 is closed and insulating oil is directly allowed to fill the oil impregnating cap 56 and the cable through the pipe 59.

As stated above, the method of this invention is characterized by an oil impregnating cap fixed to each of the two ends of a cable, of which the interior of the sheath has been made vacuum, and the interior of one of the oil impregnating caps is subjected to vacuum pumping means while the interior of the other oil impregnating cap is filled with degassed insulating oil, and holes are then made in the end of the lead sheath at both ends of the cable to lead the insulating oil into and through the interior of the cable at one end and travel to the opposite end of the cable where the vacuum pump is operating. In this way the cable is impregnated by fully filling the interior of the sheath with degassed insulating oil without breaking vacuum through exposure to the atmosphere when the interior of the sheath of oil filled electric cable is under vacuum.

In reiteration, the invention of this application deals with cables having hollow conductor cores which are mounted on a rotary drum in a first vacuum chamber. Feeding means is provided to feed the cable from the drum through a seal into a second and independent vacuum chamber that contains therein a sheathing machine for continuously enclosing the cable core with a sheath of lead, aluminum or plastic. Thus any length of cable may be constructed by this process since the two vacuum chambers are independent from each other.

The hollow cable cores may be pre-treated in three ways. First, by heating and drying the same in a vacuum and while in vacuum, fill the same with oil and plug it, before insertion in chamber cell 4 or 31. Second, these hollow cable cores may be heated and dried in vacuum and while under vacuum impregnated with oil and their ends left open and insert them in cells 4 or 31. The third and last mode may be to heat and dry these hollow cable cores in vacuum before applying them to the cells 4 and 31. Thus any one of the prior cable core preparations may be used with this process and apparatus to provide improved hollow cored sheath cables.

We claim:
1. A method of manufacturing oil-filled cables which comprises drying under vacuum in a drying vessel a cable core having paper insulation covering, supplying said core from inside said vessel to a press through a vacuum tight joint pipe, covering said cable core with a metal sheath while the cable core passes through said press. hermetically sealing each end of the sheathed core, fitting an evacuating device to one end of the sheathed core and pouring an insulating oil into the sheathed core at the other end of the metal sheath while vacuum is being maintained by said evacuating device, thus, impregnating the core with the insulating oil.

2. A method of manufacturing oil-filled cables wherein the cable having been dried under vacuum in a drying vessel is characterized by the step of supplying said core from inside said vessel to a sheathing machine through a vacuum tight joint, covering said cable core with a metal sheath while the cable core passes through said sheathing machine and while the vacuum subsists, hermetically sealing each end of the sheathed core, fitting a sealed oil supplying device to the one end of the sheathed core, fitting an evacuating device to the other end of the sheathed core, puncturing each of the sealed ends of the sheathed core which maintaining a vacuum in the applied devices and pouring an insulating oil from said oil supply device into the sheathed core at the one end thereof while maintaining a vacuum by said evacuating device at the other end thereof to impregnate the core with the insulating oil.

3. A method of manufacturing oil-filled cables wherein the cable core having been dried under vacuum in a drying zone is characterized by the steps of supplying said core from said drying zone to a sheathing zone through a vacuum tight joint while maintaining vacuum conditions in said drying and sheathing zones, covering said cable core with a metal sheath while the cable core is passed through the sheathing zone, hermetically sealing each end of the sheathed core, attaching enclosure means to each end of the sealed, sheathed core to establish an access through the metal sheath into the interior of the sheathed core after producing a vacuum in each of said enclosure means for the passage of insulating oil to the cable core from the enclosure means at one end thereof while maintaining a vacuum through the enclosure means provided at the other end thereof, and filling the sheathed core with an insulating oil to impregnate the same.

4. The method of manufacturing continuous electric cables which consists of the steps of enclosing reeled cable cores in a first vacuum chamber, enclosing an extrusion cable sheathing machine in a second vacuum chamber positioned in tandem with the first vacuum chamber, providing valve sealing connection between the first and second vacuum chambers for feeding cable cores therebetween, providing a sealed discharge from the second vacuum chamber through which to discharge the sheathed cable core while the vacuum therein subsists, independently exhausting the first and second vacuum chambers to exhaust and dehumidify and degasify each chamber and the reeled cable core and the extrusion cable sheathing machine in the first and second vacuum chambers, feeding the cable cores from the reels in the exhausted first vacuum chamber through the valve sealing connection and through the extrusion cable sheathing machine in the second vacuum chamber, extruding a sheathing over the moving cable cores as they pass from the exhausted first vacuum chamber through the exhausted second vacuum chamber, closing the sheath on the cable core and sealing the ends of the vacuumized sheathed cable while the vacuum in the sheathed cable subsists, passing the moving sheathed cable through the sealed discharge from the second vacuum chamber while the vacuum in the sheathed cable and both chambers subsist, cooling the moving closed and sheathed cable passing from the second vacuum chamber, inserting and sealing the sealed ends of the vacuumized and sheathed cable in independent oil filling vacuum chambers, independently exhausting the oil filling vacuum chambers enclosing the sealed ends of the sheathed cable, puncturing the sealed ends within the exhausted independent oil filling vacuum chambers while the vacuum with the sheathed cable subsists, shutting off the vacuum exhaust from one oil filling vacuum chamber and connecting a supply of degassed insulating oil thereto, continuing the vacuum exhaust from the other oil filling vacuum chamber while the vacuum in the sheathed cable subsists and until the sheath cable is filled by the drawing of the oil by vacuum through the punctured ends of the sheathed cable from said one of the independent oil filling vacuum chambers to said other oil filling vacuum chamber to seal the whole of the sheath cable.

5. An apparatus for the manufacture of continuous electric cables comprising an exhaustible vacuum cell for receiving cable cores therein, a cable core feeding means in said vacuum cell, an exhaustibly enclosed cable sheathing extrusion machine connected to said vacuum cell to receive the cable cores from said feeding means and having a sealed cable discharge, and an enclosed valve connection between the said vacuum cell and said exhaustibly enclosed cable sheathing extrusion machine, the latter sheathing extrusion machine receiving the cable cores fed through said enclosed valve to continuously sheath the same while in said exhaustibly enclosed cable sheathing extrusion machine and being kept in the state of vacuum and discharged therefrom while the vacuum therein subsists, means to seal the ends of the sheathed cable to retain the vacuum in the same, an oil impregnating cap mounted on each of the two sealed ends of the sheathed cable to retain a vacuum therein, a vacuum pump connected to the interior of each of the oil impregnating caps to exhaust the same, sheath puncturing means in each cap to pierce and leave a hole in the cable sheath at both ends after the caps have been exhausted to maintain the vacuum in the punctured sheathed cable, means connected to the interior of one oil impregnating cap to supply the same with degassed insulating oil after the same has been evacuated, said vacuum pump connected to said other cap drawing the oil through the punctured ends of the cable sheath in said caps and through the full length of the cable impregnating the interior of the cable with an insulating oil by supplying the insulating oil through the punctured hole of the sheath in said one oil impregnated cap and withdrawing the oil through the cable by pumping a vacuum through the hole at the other end of the sheathed cable in said other oil impregnating cap.

6. Apparatus for impregnating with insulating oil an exhausted, sheathed cable with hermetically sealed ends, comprising enclosure means secured to the ends of said cable, vacuum pump means connected to said enclosure means to evacuate the interior thereof, sheath puncturing means in said enclosure means to puncture the enclosed ends of the cable sheath, means connected to one of said enclosure means to disconnect said vacuum pump means and supply said enclosure means with an insulating oil while the vacuum pump means at the other of said enclosure means is maintained in operation to impregnate the interior of the cable with insulating oil.

7. Apparatus for the manufacture of oil-filled cables comprising an exhaustible vacuum cell for receiving a cable core therein to dehumidify and degasify the same, an exhaustible enclosed cable sheathing machine to receive the dehumidifier and degasified cable core, a sealed cable discharge in said exhaustible enclosed cable sheathing machine, a sheath squeezing device for sealing the sheath to said cable core upon the discharge of each end of the sheathed cable from said cable sheathing machine, an enclosed sealed connection between said vacuum cell and said enclosed cable sheathing machine, evacuating means connected to said vacuum cell and said enclosed cable sheathing machine, means in said vacuum seal for feeding the dehumidified and degassified cable core through said enclosed sealed connection and through said enclosed sheathing machine to sheath the same while said evacuating means maintain a vacuum in said vacuum cell and in said enclosed sheathing machine, enclosure means secured to the ends of the cable as sheathed, a vacuum pump means connected to said enclosure means to evacuate the interior thereof, sheath puncturing means in said enclosure means to puncture the enclosed ends of the cable sheath, means connected to one of said enclosure means to disconnect said vacuum pump means and supply said enclosure means with an insulating oil while the vacuum pump means at the other of said enclosure means is maintained in operation to impregnate the interior of the cable with insulating oil.

8. Apparatus to impregnate with insulating oil a heat-exhausted sheathed cable core with sealed ends, consisting of an evacuating cap fitted in sealed relation to each end of the cable core, a sheath puncturing means carried by each evacuating cap to puncture the cable sheath ends enclosed by each evacuating cap, means to supply insulating oil to one evacuating cap at one punctured end of a sheathed cable core, and a vacuum pump connected to the other evacuating cap at the other punctured end of the sheathed cable core to draw the insulating oil from the first evacuating cap and through the punctured sheathed cable core to the second evacuating cap to impregnate the sheathed cable core.

9. Apparatus for impregnating with insulating oil a heat-exhausted and sheathed cable core with sealed ends, consisting of an evacuating cap fitted in sealed relation to each end of the sheathed cable core, vacuum pump means connected to said evacuating caps to evacuate the same, sheath puncturing means in each evacuating cap to puncture the enclosed ends of the cable sheath, means connected to one of said evacuating caps to shut off the vacuum and supply the same with degassed insulating oil, said vacuum pump on the other of said evacuating caps drawing the insulating oil through the punctured ends and through the full length of the sheathed cable core to impregnate the interior of the cable with insulating oil.

References Cited
UNITED STATES PATENTS

| | | | |
|---|---|---|---|
| 2,531,156 | 11/1950 | Piercy et al. | 156—48 X |
| 3,013,912 | 12/1961 | Priaroggia et al. | 156—51 X |
| 3,032,464 | 5/1962 | Grieve | 156—51 X |
| 3,409,488 | 11/1968 | Kusakabe | 156—48 |

JOHN T. GOOLKASIAN, Primary Examiner

R. A. KILLWORTH, Assistant Examiner

U.S. Cl. X.R.

118—408; 156—51; 174—25